United States Patent

Locke

[11] Patent Number: 6,024,291
[45] Date of Patent: Feb. 15, 2000

[54] AUXILIARY WARMING DEVICE FOR VEHICLES

[76] Inventor: Duncan L. Locke, 4139 N. 71st St., Lincoln, Nebr. 68507

[21] Appl. No.: 08/719,772

[22] Filed: Sep. 25, 1996

[51] Int. Cl.⁷ ...................................................... B60H 1/02
[52] U.S. Cl. ......................................... 237/12.3 R; 237/28
[58] Field of Search ........................ 237/12.3 R, 12.3 C, 237/28; 165/170

[56] References Cited

U.S. PATENT DOCUMENTS

| | | | |
|---|---|---|---|
| 2,762,570 | 9/1956 | Zimmerman | 237/12.3 R |
| 3,867,939 | 2/1975 | Moore et al. | 128/254 |
| 3,967,627 | 7/1976 | Brown | 128/400 |
| 4,114,620 | 9/1978 | Moore et al. | 128/254 |
| 4,259,961 | 4/1981 | Hood, III | 128/400 |
| 4,459,468 | 7/1984 | Bailey | 219/400 |
| 4,844,072 | 7/1989 | French et al. | 128/400 |
| 4,982,895 | 1/1991 | Shimizu et al. | 237/2 A |
| 5,082,049 | 1/1992 | Nekola | 165/32 |
| 5,174,285 | 12/1992 | Fontenot | 128/400 |
| 5,181,655 | 1/1993 | Bruckelmyer | 237/1 R |
| 5,183,039 | 2/1993 | Sarian et al. | 128/400 |
| 5,277,038 | 1/1994 | Carr | 62/434 |
| 5,344,436 | 9/1994 | Fontenot et al. | 607/104 |

*Primary Examiner*—Henry A. Bennett
*Assistant Examiner*—Derek S. Boles
*Attorney, Agent, or Firm*—Zarley, McKee, Thomte, Voorhees & Sease; Dennis L. Thomte

[57] ABSTRACT

An auxiliary warming device includes a hollow enclosed housing with an inlet and outlet port to permit the flow of fluid through the housing. At least the top surface of the housing is thermally conductive, and a baffle is provided within the housing to cause the fluid to flow throughout the entire housing before exiting the outlet port. The auxiliary warming device is installed on a vehicle, and a pair of hoses connect the housing ports to the downstream side of the primary heater in the vehicle, so as to use the warmed fluid from the heater to warm the surface of the auxiliary warming device. A valve is provided to permit the selective bypassing of the auxiliary warming device.

11 Claims, 3 Drawing Sheets

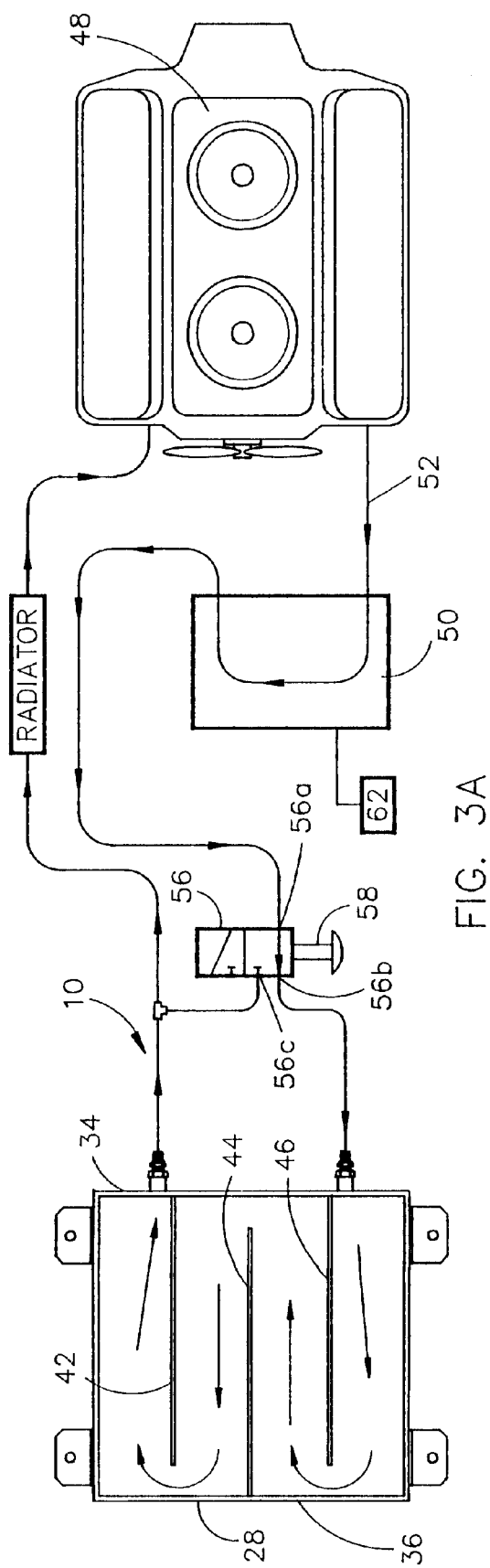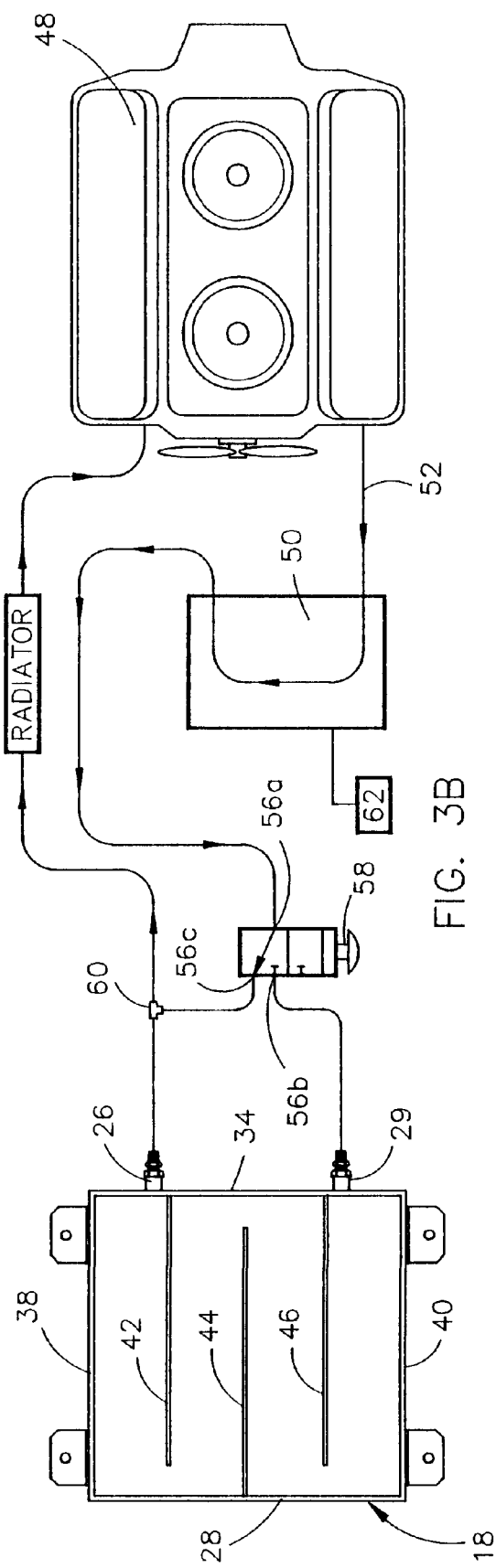

AUXILIARY WARMING DEVICE FOR VEHICLES

TECHNICAL FIELD

The present invention relates generally to vehicles with auxiliary heaters, and more particularly to an improved warming device for cabinets and bottles which is, connected to the vehicle's existing heating system.

BACKGROUND OF THE INVENTION

Cold weather has many detrimental effects, especially in the construction and maintenance fields. For example, it is a common requirement for railroad maintenance employees to weld rail or the like. However, it is difficult to obtain the desirable pressure and flow of propane gas from a liquid propane bottle or tank when the temperature reaches freezing or below.

Although other auxiliary heaters are known in the prior art, they typically utilize a source of combustion or an electrical circuit and motor to produce heat. Such apparatus would be extremely hazardous if located proximal to a liquid propane bottle.

SUMMARY OF THE INVENTION

It is therefore a general object of the present invention to provide an improved auxiliary warming device for vehicles.

Another object is to provide a vehicle auxiliary warming device with a heating element which does not utilize a proximal source of combustion or electricity.

Still another object of the present invention is to provide an auxiliary warming device for a vehicle which operates off of the vehicle's existing heating system without reducing the heat provided by the primary heat source.

A further object is to provide an auxiliary warming device for vehicles which is simple to install and easy to operate.

These and other objects will be apparent to those skilled in the art.

The auxiliary warming device of the present invention includes a hollow enclosed housing with an inlet and outlet port to permit the flow of fluid through the housing. At least the top surface of the housing is thermally conductive, and a baffle is provided within the housing to cause the fluid to flow throughout the entire housing before exiting the outlet port. The auxiliary warming device is installed on a vehicle, and a pair of hoses connect the housing ports to the downstream side of the primary heater in the vehicle, so as to use the warmed fluid from the heater to warm the surface of the auxiliary warming device. A valve is provided to permit the selective bypassing of the auxiliary warming device.

BRIEF DESCRIPTION OF THE DRAWINGS

FIG. 3A is a schematic diagram showing the connection of the auxiliary warming device to the vehicle heating system;

FIG. 3B is a view similar to FIG. 3A, showing the fluid flow after activation of a bypass switch;

DESCRIPTION OF THE PREFERRED EMBODIMENTS

Figure 1:
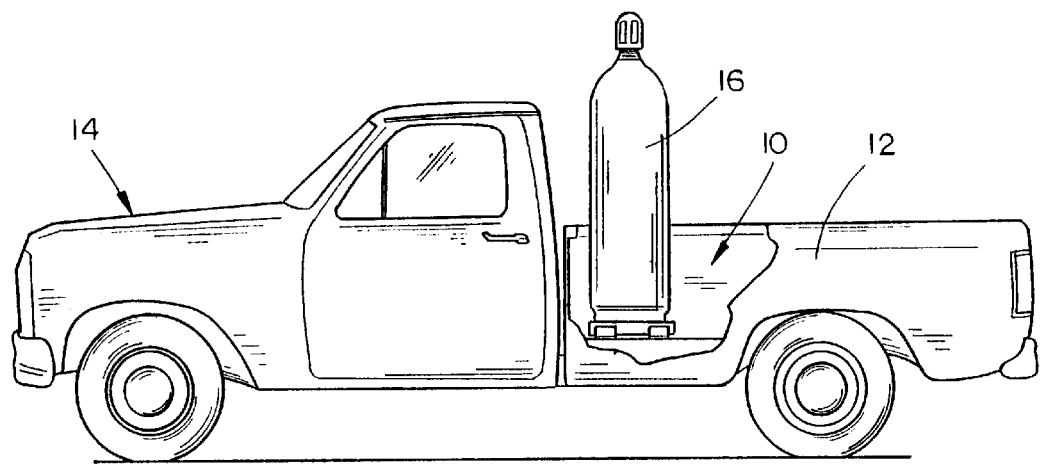
FIG. 1 is a side elevational view of a vehicle showing the heating plate of the warming device of the present invention, with a liquid propane bottle thereon.

Referring now to the drawings, in which similar or corresponding parts are identified with the same reference numeral and more particularly to FIG. 1, the auxiliary warming device of the present invention is designated generally at 10 and is shown installed in the bed 12 of a pickup truck 14, with a conventional liquid propane (LP) bottle 16 supported on the warming device 10.

Figure 2:
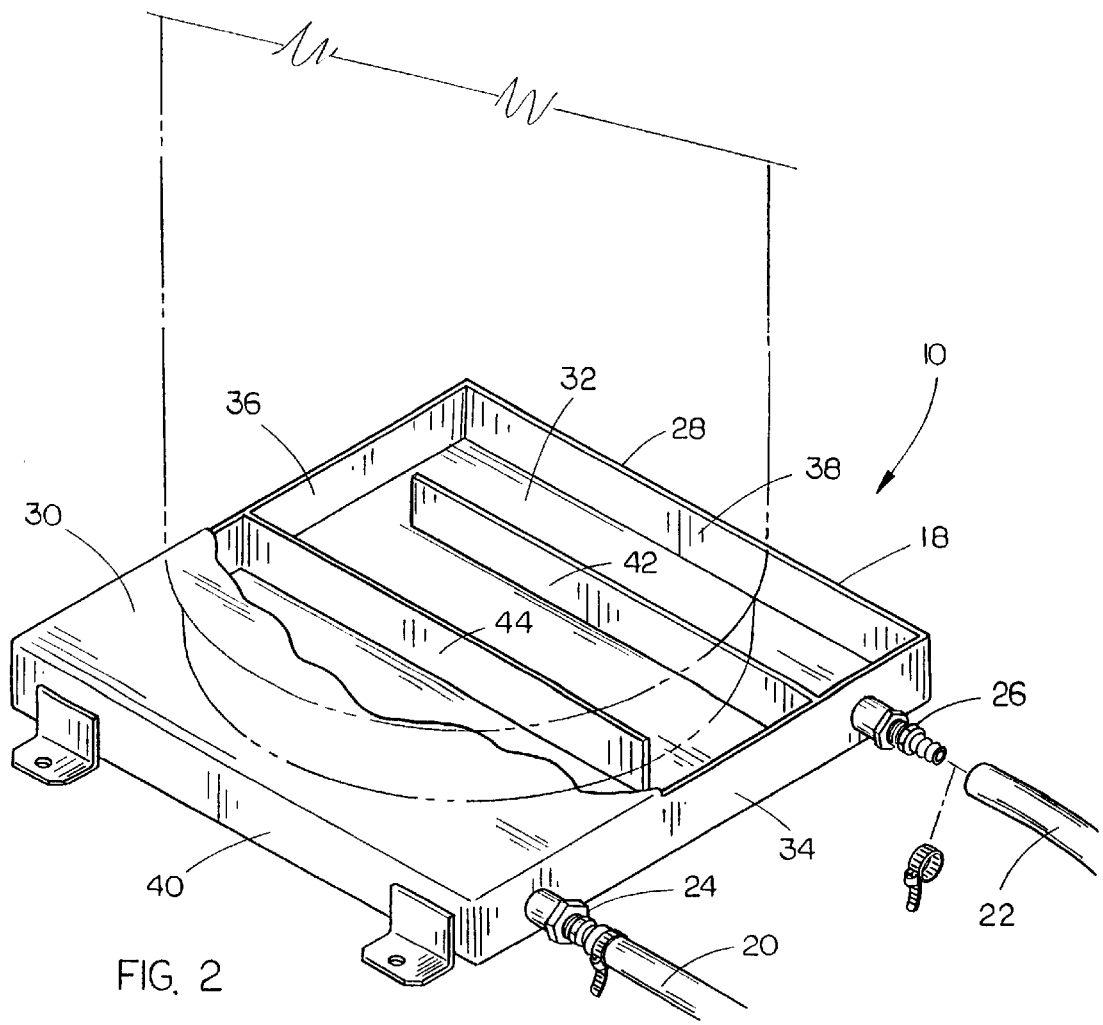
FIG. 2 is an enlarged perspective view of the heating plate of the present invention with portions broken away to show the interior thereof.

Referring now to FIG. 2, the auxiliary warming device 10 includes a heating unit 18 with a pair of hoses 20 and 22 connected to ports 24 and 26 respectively on one side of the heating unit 18. Heating unit 18 includes an enclosed hollow housing 28 with a top wall 30, bottom wall 32, forward and rearward end walls 34 and 36, and opposing side walls 38 and 40. Three baffles 42, 44 and 46 (shown in FIG. 3A) are mounted within the interior of housing 28 to form a serpentine pattern through which fluid will flow to heat the housing top wall 30. Baffles 42 and 46 extend rearwardly from forward end wall 34, while baffle 44 extends forwardly from rearward end wall 36, baffle 44 located parallel and interposed between baffles 42 and 46.

Port 24 is formed in housing forward end wall 34 and provides fluid access to the interior of housing 28, and is located between baffle 46 and side wall 40. For purposes of this application, port 24 will be designated as the entry port 24 through which heated fluid will pass into housing 28. Port 26 is formed in the housing forward wall 34 between baffle 42 and side wall 38, and will be designated as the exit port for housing 28 throughout this application.

FIG. 3A is a schematic diagram showing the existing vehicle motor 48 and existing vehicle heater 50. In the existing vehicle heating system, heated fluid from motor 48 passes through a conduit 52 to the vehicle heater 50. After the fluid has given up some heat at heater 50, it is returned via conduit 54 to motor 48 for reheating. FIGS. 3A and 3B show that the auxiliary warming device 10 of the present invention is connected to the return conduit 54 and interposed between heater 50 and motor 48 on the downstream side of heater 50. A two position three-way valve 56 is provided with an input port 56a and two output ports 56b and 56c. A valve switch 58 is operable to selectively connect input port 56a with either output port 56b or output port 56c.

Output port 56b is fluidly connected to entry port 24 of heating unit 18 to supply fluid thereto when switch 58 is in a first position as shown in FIG. 3A. Exit port 26 of heating unit 18 is connected by way of a "T" pipe 60 to return conduit 54 and output port 56c. Thus, when valve switch 58 is moved to the second position as shown in FIG. 3B, fluid from inlet port 56a will be directed to output port 56c and recirculated back to motor 48, bypassing heater unit 18. Vehicle heater 50 is provided with a switch 62 for selectively activating heater 50 as desired. When switch 62 is in the off position, fluid does not flow through vehicle heater 50, thereby deactivating the entire auxiliary warming device 10. When switch 62 is in the on position, fluid will flow through the vehicle heater system, and the valve switch 58 may be selected to cause warm fluid to flow through heater unit 18 (FIG. 3A) or bypass heater unit 18 (FIG. 3B).

Figure 4:
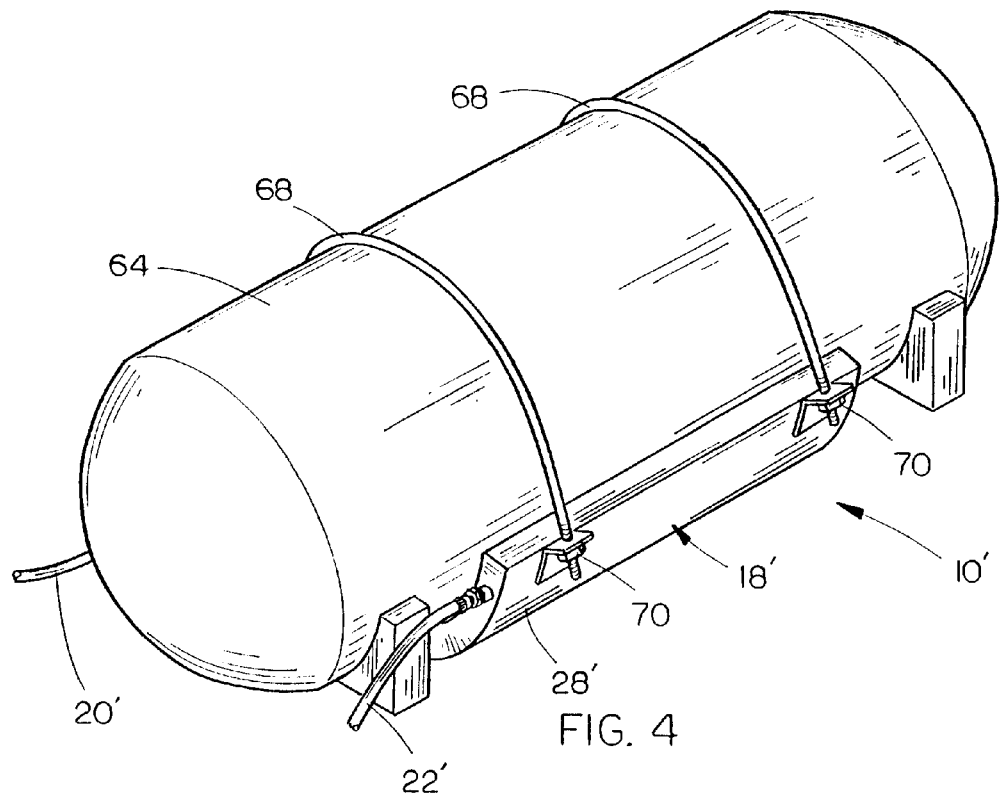
FIG. 4 is a perspective view of a second embodiment of the heating plate of the invention with a liquid propane tank attached thereto.
Figure 5:
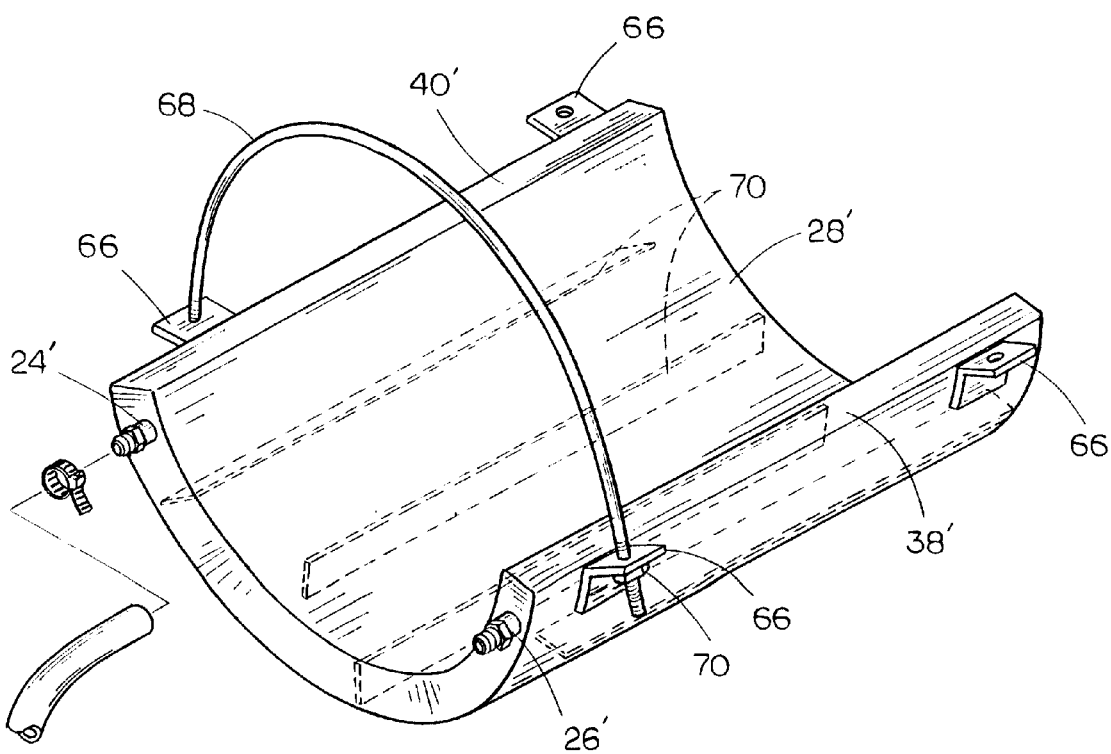
FIG. 5 is a view similar to FIG. 4, with the tank removed to show interior details of the heating plate.

Referring now to FIGS. 4 and 5, a second embodiment of the auxiliary warming device is designated generally at 10' and includes a heating unit 18' and a pair of hoses 20' and 22', similar to the first embodiment of the invention.

However, the second embodiment includes a housing 28' which is curved to a semi-cylindrical shape to receive a generally cylindrical LP tank 64, as shown in FIG. 4. A pair of brackets, 66 are affixed along each side wall 38' and 40', which will receive a hold-down rod 68 therein. Each end of the hold-down rod 68 is threaded through a threaded aperture in the associated brackets 66 and a nut 70 may be adjusted to tighten each hold-down rod 68 on to tank 64.

Inlet and outlet ports 24' and 26' communicate with the interior of housing 28' to cause fluid flow in a general serpentine pattern around baffles 70 within housing 28'.

Whereas the invention has been shown and described in connection with the preferred embodiment thereof, many modifications, substitutions and additions may be made which are within the intended broad scope of the appended claims. For example, the heating unit and associated tank or bottle may be housed within a cabinet, to further retain heat around the bottle/tank. While the inventor has found that a metal housing is sufficiently thermally conductive, other equivalent materials could be utilized.

I claim:

1. An auxiliary warming device for a vehicle, comprising:
   a heating unit including a hollow, enclosed housing with at least a top surface;
   said housing top surface formed of a thermally conductive material;
   said housing top surface being generally semi-cylindrical in shape, to receive a cylindrical tank thereon.
   an inlet port and an outlet port formed in said housing and spaced apart from one another:
   a baffle within said housing located to cause fluid to flow around at least one end thereof when flowing from the inlet port to the outlet port;
   a first hose having one end connected to the housing inlet port and the other end fluidly connected to a source of fluid;
   a second hose having one end connected to the housing outlet port and the other end fluidly connected to a reservoir for collecting fluids; and
   means for causing fluid to flow through the housing from the inlet port to the outlet port.

2. An auxiliary warming device for a vehicle, comprising:
   a heating unit including a hollow, enclosed housing with at least a top surface,
   said housing top surface formed of a thermally conductive material;
   said housing top surface being generally semi-cylindrical in shape, to receive a cylindrical tank thereon;
   an inlet port and an outlet port formed in said housing and spaced apart from one another;
   a plurality of baffles within said housing, located to cause fluid within the housing to flow in a general serpentine pattern from the inlet port to the outlet port;
   a first hose having one end connected to the housing inlet port and the other end fluidly connected to a source of fluid;
   a second hose having one end connected to the housing outlet port and the other end fluidly connected to a reservoir for collecting fluids; and
   means for causing fluid to flow through the housing from the inlet port to the outlet port.

3. In combination:
   a vehicle having a motor and radiator with fluid circulating therebetween to cool the motor;
   said motor having an upstream side receiving cool fluid from the radiator, and a downstream side returning fluid to the radiator; and
   an auxiliary heating unit located remote from the vehicle motor and connected for fluid communication between the downstream side of said motor and said radiator;
   said auxiliary heating unit including first and second hoses extending therefrom, the first hose connected to the downstream side of the motor and the second hose connected to the radiator, said first and second hoses directing fluid from the motor to the auxiliary heating unit and thence back to the radiator for recirculation;
   said auxiliary heating unit including a hollow, enclosed housing with an inlet port and an outlet port, the inlet port connected to the first hose and the outlet port connected to the second hose.

4. The combination of claim 3, wherein said housing includes a warming surface formed of thermally conductive material.

5. The combination of claim 4, wherein said housing includes a top surface, and wherein the warming surface forms at least a portion of the top surface.

6. The combination of claim 5, further comprising a baffle within the housing located to cause fluid to flow around at least one end thereof from the inlet port to the outlet port.

7. The combination of claim 5, further comprising a plurality of baffles within said housing, located to cause fluid within the housing to flow in a general serpentine pattern form the inlet port to the outlet port.

8. The combination of claim 5, wherein said housing top surface is flat.

9. In combination:
   a vehicle having a motor and radiator with fluid circulating therebetween to cool the motor;
   said motor having an upstream side receiving cool fluid from the radiator, and a downstream side returning fluid to the radiator;
   an auxiliary heating unit located remote from the vehicle motor and connected for fluid communication between the downstream side of said motor and said radiator;
   said auxiliary heating unit including first and second hoses extending therefrom, the first hose connected to the downstream side of the motor and the second hose connected to the radiator, said first and second hoses directing fluid from the motor to the auxiliary heating unit and thence back to the radiator for recirculation;
   an operable valve interconnected between said first and second hoses;
   said valve operable between a first position, wherein fluid from the first hose is directed to the auxiliary heater, and a second position, wherein fluid from the first hose is directed to the second hose, bypassing the auxiliary heater;
   said valve including a switch for operating the valve between the first and second positions; and
   said heating unit including a hollow, enclosed housing with an inlet port and an outlet port, the inlet port connected to the first hose and the outlet port connected to the second hose.

10. The combination of claim 9, wherein said housing includes a thermally conductive flat top surface, and a baffle within the housing located to cause fluid to flow around at least one end thereof from the inlet port to the outlet port.

11. In combination:
   a vehicle having a motor and radiator with fluid circulating therebetween to cool the motor;

said motor having an upstream side receiving cool fluid from the radiator, and a downstream side returning fluid to the radiator; and an auxiliary heating unit located remote from the vehicle motor and connected for fluid communication between the downstream side of said motor and said radiator;

said auxiliary heating unit including first and second hoses extending therefrom, the first hose connected to the downstream side of the motor and the second hose connected to the radiator, said first and second hoses directing fluid from the motor to the auxiliary heating unit and thence back to the radiator for recirculation;

said auxiliary heating unit including a hollow, enclosed housing with a flat top surface;

an operable valve interconnected between said first and second hoses;

said valve operable between a first position, wherein fluid from the first hose is directed to the auxiliary heater, and a second position, wherein fluid from the first hose is directed to the second hose, bypassing the auxiliary heater; and said valve including a switch for operating the valve between the first and second positions.

* * * * *